United States Patent
Ko

(10) Patent No.: US 9,013,810 B2
(45) Date of Patent: Apr. 21, 2015

(54) WIDE-ANGLE IMAGE LENS WITH HIGH RESOLUTION AND SHORT OVERALL LENGTH

(71) Applicant: Hon Hai Precision Industry Co., Ltd., New Taipei (TW)

(72) Inventor: Chun-Cheng Ko, New Taipei (TW)

(73) Assignee: Hon Hai Precision Indsutry Co., Ltd., New Taipei (TW)

( * ) Notice: Subject to any disclaimer, the term of this patent is extended or adjusted under 35 U.S.C. 154(b) by 75 days.

(21) Appl. No.: 13/711,497

(22) Filed: Dec. 11, 2012

(65) Prior Publication Data

US 2014/0146400 A1    May 29, 2014

(30) Foreign Application Priority Data

Nov. 26, 2012   (TW) .................................. 10114114

(51) Int. Cl.
*G02B 13/18* (2006.01)
*G02B 9/34* (2006.01)

(52) U.S. Cl.
CPC . *G02B 9/34* (2013.01); *G02B 13/18* (2013.01)

(58) Field of Classification Search
CPC .......... G02B 9/00; G02B 9/34; G02B 13/001; G02B 13/0015; G02B 13/002; G02B 13/004; G02B 13/0055; G02B 13/006; G02B 13/06
See application file for complete search history.

(56) References Cited

U.S. PATENT DOCUMENTS 7,911,715 B2 *   3/2011   Shinohara ..................... 359/779

* cited by examiner

*Primary Examiner* — Ricky Mack
*Assistant Examiner* — Robert E Tallman
(74) *Attorney, Agent, or Firm* — Novak Druce Connolly Bove + Quigg LLP

(57) ABSTRACT

A wide-angle image lens, in the order from the object side to the image side thereof, includes a first lens, a second lens, a third lens, a fourth lens and an image plane. The image lens satisfies the following formulas: D/TTL>0.45; CT4/ET4<2.11; Z/Y>0.06; wherein D is the maximum image diameter of the image plane; TTL is a total length of the wide-angle image lens; CT4 is a distance along an optical axis from the seventh surface to the eighth surface; ET4 is a distance along the optical axis from an outmost edge of the seventh surface to an outmost edge of the eighth surface; Z is a distance from a central point of the fifth surface to an outmost edge of the sixth surface along the optical axis; Y is a distance from the outmost edge of the sixth surface to the optical axis.

12 Claims, 19 Drawing Sheets

WIDE-ANGLE IMAGE LENS WITH HIGH RESOLUTION AND SHORT OVERALL LENGTH

BACKGROUND

1. Technical Field

The present disclosure relates to lenses and, particularly, to a wide-angle image lens with high resolution and short overall length.

2. Description of Related Art

Image sensors are used to capture an image. A size of an image sensor, such as a complementary metal oxide semiconductor device (CMOS), decreases with development of technology. For proper matching with the image sensor, an image lens, which is essentially comprised of a number of lenses, should be able to meet requirements, such as, high resolution and short overall length. However, the existing image lenses cannot meet these requirements, resulting either in high resolution images from large image lenses or lower resolution images from small image lenses.

Therefore, it is desirable to provide a wide-angle image lens which can overcome the limitations described above.

DETAILED DESCRIPTION

Embodiments of the disclosure will now be described in detail with reference to the accompanying drawings.

Figure 1:
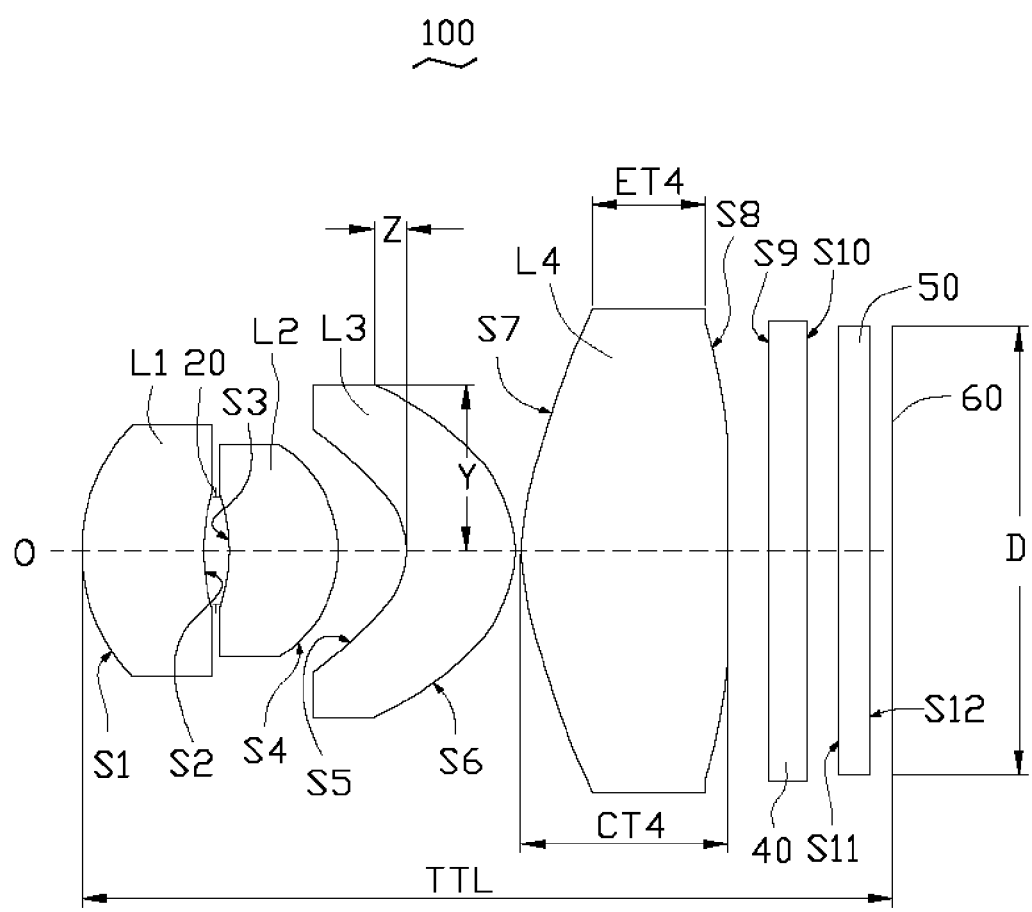
FIG. 1 is a schematic view of a wide-angle image lens in accordance with the present disclosure.

FIG. 1 shows a wide-angle image lens 100, according to an exemplary embodiment, optically capturing an image of an object at an object side and forming a corresponding image on an image plane 60. The wide-angle image lens 100 includes, in an order from the object side to the image side, a first lens L1 with positive refraction power, a second lens L2 with positive refraction power, a third lens L3 with negative refraction power, a fourth lens L4 with positive refraction power, an IR-cut filter 40, a protective glass 50, and the image plane 60.

The first lens L1 includes a convex first surface S1 facing the object side and a concave second surface S2 facing the image side.

The second lens L2 includes a concave third surface S3 facing the object side and a convex fourth surface S4 facing the image side.

The third lens L3 includes a concave third surface S5 facing the object side and a convex sixth surface S6 facing the image side.

The fourth lens L4 includes a convex seventh surface S7 facing the object side and a convex eighth surface S8 facing the image side.

The IR-cut filter 40 includes a ninth surface S9 facing the object side and a tenth surface S10 facing the image side.

The protective glass 50 includes an eleventh surface S11 facing the object side and a twelfth surface S12 facing the image side.

The wide-angle image lens 100 further includes an aperture stop 20. The aperture stop 20 is positioned between the first lens L1 and the second lens L2. Light rays enter the wide-angle image lens 100, passing through the first lens L1, the aperture stop 20, the second lens L2, the third lens L3, the fourth lens L4, the IR-cut filter 40, the protective glass 50, and finally forming optical images on the image plane 60. The aperture stop 20 is for adjusting light flux from the first lens L1 to the second lens L2. In addition, the aperture stop 20 facilitates uniform light transmission when light passes through the first lens L1 to correct coma aberrations of the wide-angle image lens 100. The IR-cut filter 40 filters/removes infrared light from the light rays.

The wide-angle image lens 100 satisfies the formulas:

$$D/TTL>0.45; \quad (1)$$

$$CT4/ET4<2.11; \quad (2)$$

$$Z/Y>0.06; \quad (3)$$

wherein D is the maximum image diameter of the image plane 60; TTL is a total length of the wide-angle image lens 100; CT4 is a distance along an optical axis O of the wide-angle image lens 100 from the seventh surface S7 of the fourth lens L4 to the eighth surface S8 of the fourth lens L4; ET4 is a distance in a direction parallel to the optical axis O of the wide-angle image lens 100 from an outmost edge of the seventh surface S7 to an outmost edge of the eighth surface S8; Z is a distance from a central point of the fifth surface S5 to an outmost edge of the sixth surface S6 along the optical axis O; Y is a distance from the outmost edge of the sixth surface S6 to the optical axis O along a direction perpendicular to the optical axis O.

The formulas (1) and (2) are for shortening the length of the wide-angle image lens 100, and reducing the aberration of the field curvature and spherical aberration in the zoom process. Formula (3) is for properly distributing the refraction power, while maintaining a relatively small spherical aberration. If the wide-angle image lens 100 does not satisfy the formulas (1) to (3), the length of the wide-angle image lens 100 then a desired shortened length cannot be obtained while still be able to correct the images captured by the wide-angle image lens 100.

The wide-angle image lens 100 further satisfies the formula:

$$0<|R11/F1|<|R32/F3|<|R22/F2|<|R41/F4|; \quad (4)$$

wherein R11 is the curvature radius of the first surface S1 of the first lens L1; F1 is focal length of the first lens L1; R32 is the curvature radius of the sixth surface S6 of the third lens L3; F3 is focal length of the third lens L3; R22 is the curvature radius of the fourth surface S4 of the second lens L2; F2 is focal length of the second lens L2; R41 the curvature radius of the seventh surface S7 of the fourth lens L4; F4 is focal length of the fourth lens L4.

Formula (4) is for maintaining quality of images captured by the wide-angle image lens 100. If the wide-angle image lens 100 does not satisfy the formula (4), the images captured by the wide-angle image lens 100 cannot be corrected.

The wide-angle image lens 100 further satisfies the formula:

$$|R42/F4|>|R41/F4|>0; \tag{5}$$

wherein R42 the curvature radius of the eighth surface S8 of the fourth lens L4.

Formula (5) is for correcting chromatic aberration of the wide-angle image lens 100. If the wide-angle image lens 100 does not satisfy the formula (5), the images captured by the wide-angle image lens 100 will have too much chromatic aberration.

The wide-angle image lens 100 further satisfies the formula:

$$0<R11/F1<0.24 \text{ and } 0<R12/F1<0.26; \tag{6}$$

wherein R12 is the curvature radius of the second surface S2 of the first lens L1.

The wide-angle image lens 100 further satisfies the formula:

$$-0.80<R21/F2<0 \text{ and } -0.4<R22/F2<0; \tag{7}$$

wherein R21 is the curvature radius of the third surface S3 of the second lens L2.

The wide-angle image lens 100 further satisfies the formula:

$$0<R31/F3<0.2 \text{ and } 0<R32/F3<0.28; \tag{8}$$

wherein R31 is the curvature radius of the fifth surface S5 of the third lens L3.

The wide-angle image lens 100 further satisfies the formula:

$$0<R41/F4<0.59 \text{ and } 0<R42/F4<4.39; \tag{9}$$

The wide-angle image lens 100 further satisfies the formula:

$$Vd1>53, Vd2>53, Vd3>53, \text{ and } Vd4>53; \tag{10}$$

wherein Vd1 is the Abbe number of the first lens L1; Vd2 is the Abbe number of the second lens L2; Vd3 is the Abbe number of the third lens L3; Vd4 is the Abbe number of the fourth lens L4.

The first, second, third, fourth, fifth, sixth, seventh, and eighth surfaces S1, S2, S3, S4, S5, S6, S7 and S8 are aspherical surfaces. Each aspherical surface is shaped according to the formula:

$$Z = \frac{ch^2}{1+\sqrt{1-(k+1)c^2h^2}} + \sum A_i h^i$$

wherein Z is the length of a line drawn from a point on the aspherical surface to the tangential plane of the aspherical surface, h is the height from the optical axis to the point on the aspherical surface, c is a vertex curvature (=1/R, the radius of curvature), k is a conic constant, and Ai are the correction coefficients, to the order of "i" of the aspherical surface.

Detailed examples of the wide-angle imaging lens 100 are given below and performance characteristics provided in FIGS. 2-19, but it should be noted that the wide-angle imaging lens 100 is not limited by these examples. Listed below are the symbols used in these detailed examples:

FNo: F number;
2ω: field angle;
ri: radius of curvature of the surface Si;
Di: distance between surfaces on the optical axis of the surface Si and the surface Si+1;
Ni: refractive index of the surface Si;
Vi: Abbe constant of the surface Si;
Ki: Secondary curvature of the surface Si.

Example 1

Tables 1-4 show a first embodiment of the wide-angle image lens 100.

TABLE 1

| Surface | type | ri (mm) | Di (mm) | ni | Vi | ki |
|---|---|---|---|---|---|---|
| first surface S1 | aspherical | 4.24 | 2.23 | 1.53 | 56.0 | −8.4577 |
| second surface S2 | aspherical | 4.62 | 0.22 | — | — | — |
| aperture stop 20 | standard | infinity | 0.26 | — | — | — |
| third surface S3 | aspherical | −4.42 | 2.04 | 1.53 | 56.0 | — |
| fourth surface S4 | aspherical | −2.20 | 1.23 | — | — | −0.1057 |
| fifth surface S5 | aspherical | −1.33 | 2.01 | 1.53 | 56.0 | −1.8099 |
| sixth surface S6 | aspherical | −2.47 | 0.10 | — | — | −4.2167 |
| seventh surface S7 | aspherical | 3.81 | 3.82 | 1.53 | 56.0 | −4.0642 |
| eighth surface S8 | aspherical | 33.70 | 0.76 | — | — | 2.7051 |
| ninth surface S9 | standard | infinity | 0.70 | 1.52 | 64.2 | — |
| tenth surface S10 | standard | infinity | 0.60 | — | — | — |
| eleventh surface S11 | standard | infinity | 0.55 | 1.52 | 64.2 | — |
| twelfth surface S12 | standard | infinity | 0.40 | — | — | — |
| image plane 60 | standard | — | — | — | — | — |

TABLE 2

| aspherical coefficient | first surface S1 | second surface S2 | third surface S3 | fourth surface S4 |
|---|---|---|---|---|
| A4 | 0.0171 | 2.3E−03 | −0.0163 | 7.5E−03 |
| A6 | −1.4459 | 0.0124 | 3.0E−03 | −4.9E−04 |
| A8 | 1.9E−04 | −9.7E−03 | −8.1E−03 | 1.5E−04 |
| A10 | 1.7E−06 | 5.0E−04 | −3.0E−04 | −3.6E−05 |

TABLE 3

| aspherical coefficient | fifth surface S5 | sixth surface S6 | seventh surface S7 | eighth surface S8 |
|---|---|---|---|---|
| A4 | −9.0E−03 | −0.0293 | −4.8E−03 | −4.4E−03 |
| A6 | −5.6E−03 | 3.3E−03 | 3.7E−04 | 1.4E−04 |
| A8 | 9.7E−04 | −3.8E−04 | −1.1E−05 | 2.5E−09 |
| A10 | −5.9E−06 | 1.9E−05 | 1.3E−07 | −2.3E−08 |

TABLE 4

| F(mm) | F/No | 2ω |
|---|---|---|
| 5.92 | 2.37 | 70.04° |

In the first embodiment, D=8.32 mm; TTL=14.907 mm; Z=0.585 mm; Y=3.098 mm; ET4=2.043 mm; F1=32.562 mm; F2=6.365 mm; F3=−13.861 mm; F4=7.857 mm.

Figure 2:
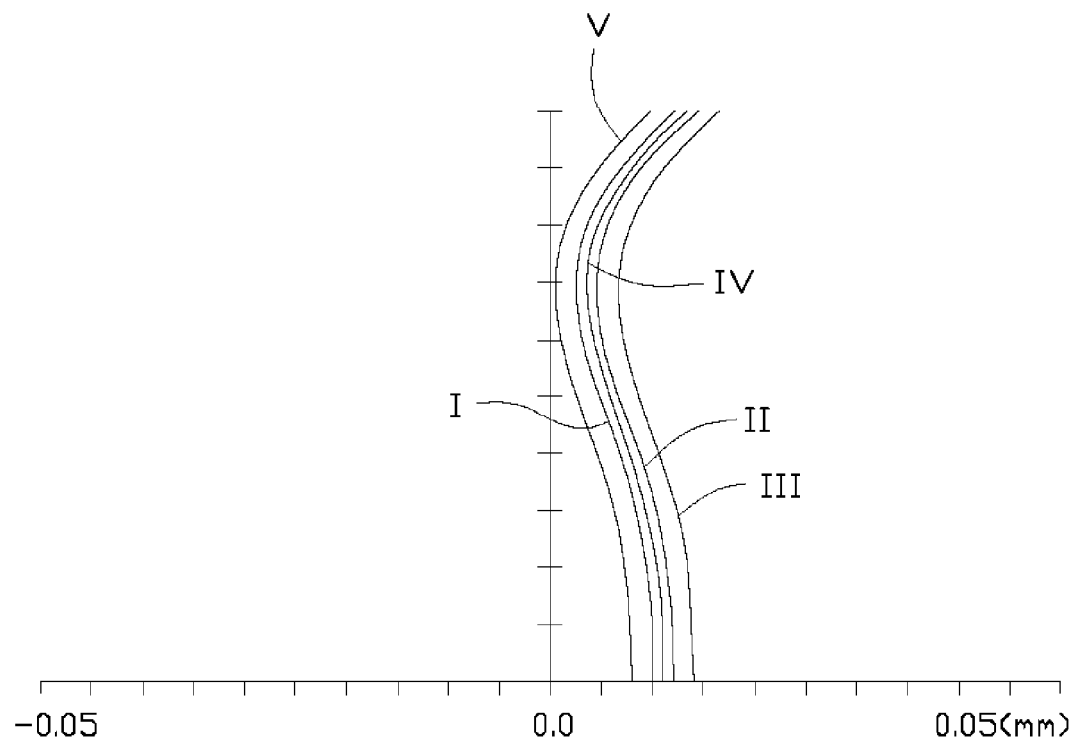
FIGS. 2~7 are graphs respectively showing spherical aberration, field curvature, distortion, relative illumination, chief ray angle, and characteristic curves of modulation transfer function occurring in the wide-angle image lens, according to a first exemplary embodiment.
Figure 3:
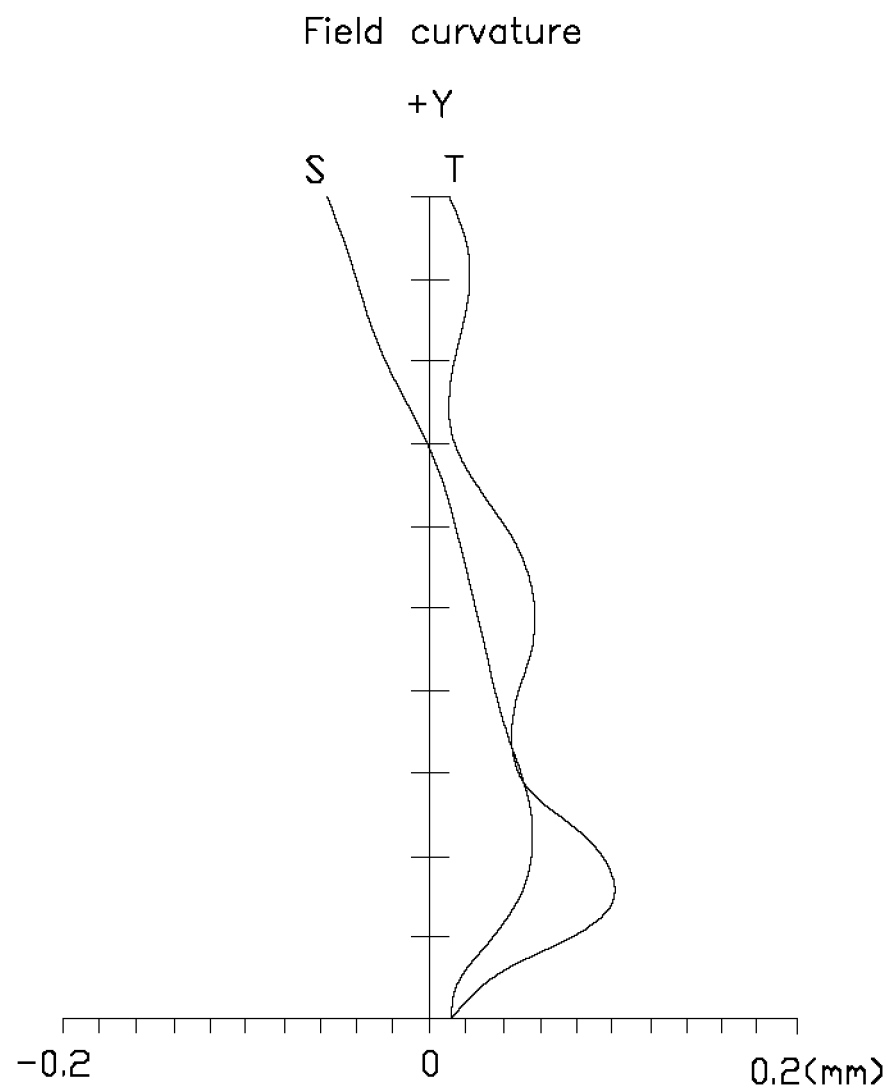
Figure 4:
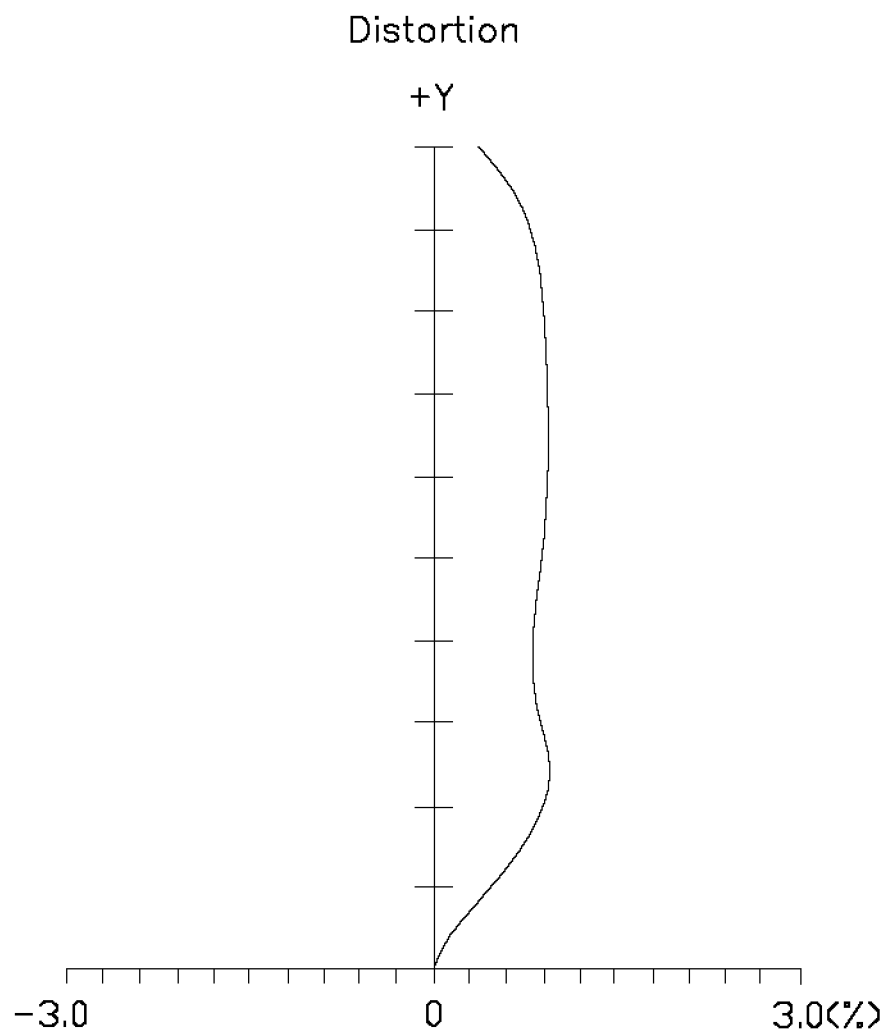
Figure 5:
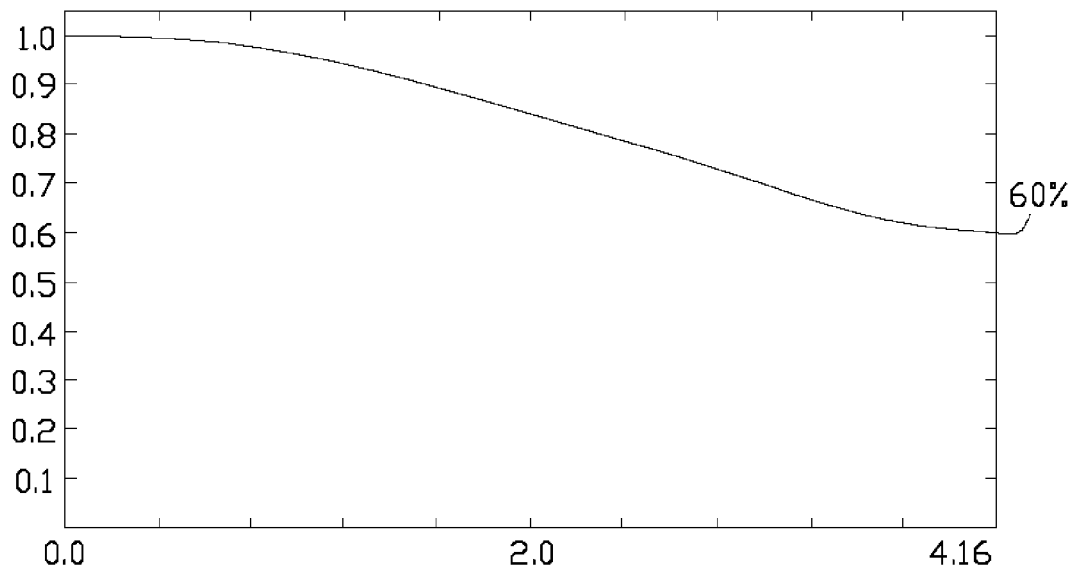
Figure 6:
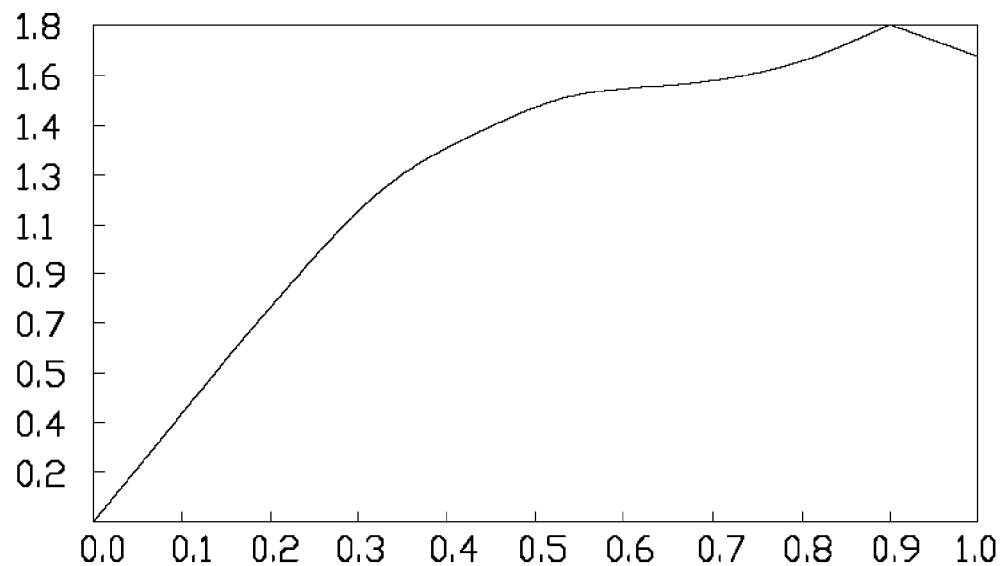
Figure 7:
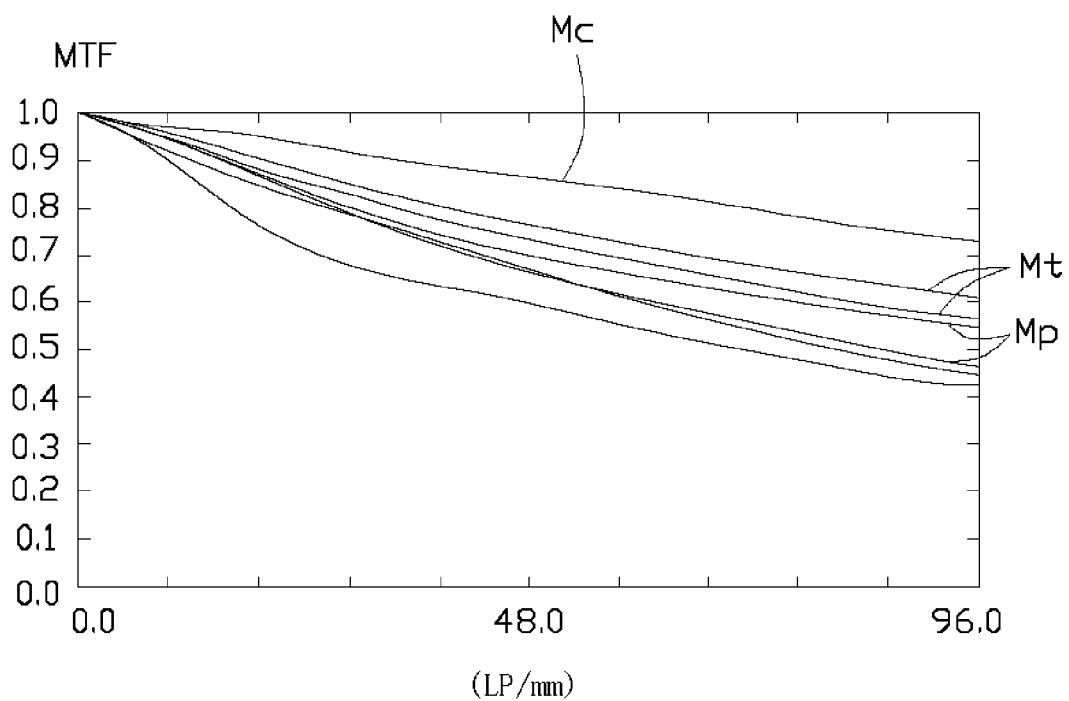

FIGS. 2-7 are graphs showing spherical aberration, field curvature, distortion, relative illumination, chief ray angle, and characteristic curves of modulation transfer function occurring in the first exemplary embodiment of the wide-angle image lens 100. In FIG. 2, curves are spherical aberration characteristic curves of I light (wavelength: 825 nm), II light (wavelength: 835 nm), III light (wavelength: 845 nm), IV light (wavelength: 830 nm) and V light (wavelength: 815 nm) of the wide-angle image lens 100. The spherical aberration of the wide-angle image lens 100 of the first exemplary embodiment is from −0.05 mm to 0.05 mm. As illustrated in FIG. 3, the curves T and S are respectively the tangential field curvature curve and the sagittal field curvature curve. The field curvature of the first exemplary embodiment of the wide-angle image lens 100 is from −0.20 mm to 0.20 mm. In FIG. 4, the distortion of the first exemplary embodiment of the wide-angle image lens 100 is from 0% to 3.00%. In FIG. 5, the relative illumination of the center region of the image plane 60 is kept higher than that of the edge region 60%. As shown in FIG. 6, the chief ray angle of the wide-angle image lens 100 of the first embodiment is limited in a range of: 0~1.8 degrees. Furthermore, as shown in FIG. 7, for half of the Nyquist frequency (about 48 lp/mm), the MTF of the central field is greater than 86% (see curve mc), the MTF of the 0.8 field is greater than 65% (see curve mp), the MTF between the central field and the 0.8 field is in a range of: 65%~86% (see curve mt, for example). Overall, in this embodiment, the spherical aberration, the field curvature, the distortion, and the chief ray angle are limited to within a small range.

Example 2

Tables 5-8 show a second embodiment of the wide-angle image lens 100.

TABLE 5

| Surface | type | ri (mm) | Di (mm) | ni | Vi | ki |
|---|---|---|---|---|---|---|
| first surface S1 | aspherical | 4.22 | 2.29 | 1.53 | 56.0 | −9.6200 |
| second surface S2 | aspherical | 4.62 | 0.22 | — | — | — |
| aperture stop 20 | standard | infinity | 0.24 | — | — | — |
| third surface S3 | aspherical | −4.41 | 2.06 | 1.53 | 56.0 | — |
| fourth surface S4 | aspherical | −2.19 | 1.22 | — | — | −0.0626 |
| fifth surface S5 | aspherical | −1.33 | 2.04 | 1.53 | 56.0 | −1.8119 |
| sixth surface S6 | aspherical | −2.48 | 0.10 | — | — | −4.2178 |
| seventh surface S7 | aspherical | 3.83 | 3.76 | 1.53 | 56.0 | −4.0287 |
| eighth surface S8 | aspherical | 31.36 | 0.73 | — | — | 4.6121 |
| ninth surface S9 | standard | infinity | 0.70 | 1.52 | 64.2 | — |
| tenth surface S10 | standard | infinity | 0.60 | — | — | — |
| eleventh surface S11 | standard | infinity | 0.55 | 1.52 | 64.2 | — |
| twelfth surface S12 | standard | infinity | 0.40 | — | — | — |
| image plane 60 | standard | — | — | — | — | — |

TABLE 6

| aspherical coefficient | first surface S1 | second surface S2 | third surface S3 | fourth surface S4 |
|---|---|---|---|---|
| A4 | 0.0184 | 1.4E−03 | −0.0171 | 8.7E−03 |
| A6 | −1.8E−03 | 0.0133 | 4.7E−03 | −3.7E−04 |
| A8 | 2.3E−04 | −0.0105 | −9.8E−03 | 3.1E−05 |
| A10 | −5.5E−07 | 4.6E−04 | −1.7E−04 | 1.2E−05 |

TABLE 7

| aspherical coefficient | fifth surface S5 | sixth surface S6 | seventh surface S7 | eighth surface S8 |
|---|---|---|---|---|
| A4 | −9.0E−03 | −0.0293 | −4.7E−03 | −4.4E−03 |
| A6 | −5.7E−03 | 3.3E−03 | 3.7E−04 | 1.3E−04 |
| A8 | 9.4E−04 | −3.8E−04 | −1.1E−05 | 3.6E−08 |
| A10 | 1.8E−06 | 1.9E−05 | 1.3E−07 | −2.2E−09 |

TABLE 8

| F(mm) | F/No | 2ω |
|---|---|---|
| 5.92 | 2.37 | 70.04° |

In the second embodiment, D=8.32 mm; TTL=14.905 mm; Z=0.555 mm; Y=3.099 mm; ET4=2.004 mm; F1=31.4 mm; F2=6.279 mm; F3=−14.276 mm; F4=7.949 mm.

Figure 8:
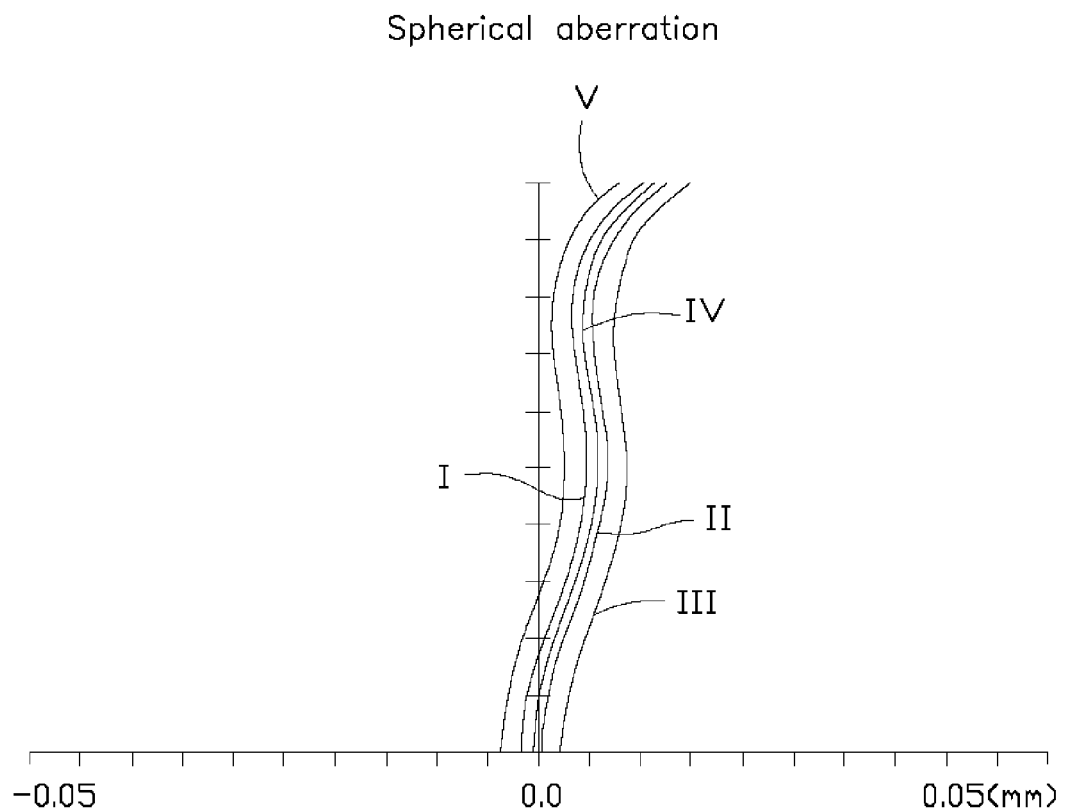
FIGS. 8~13 are graphs respectively showing spherical aberration, field curvature, distortion, relative illumination, chief ray angle, and characteristic curves of modulation transfer function occurring in the wide-angle image lens, according to a second exemplary embodiment.
Figure 9:
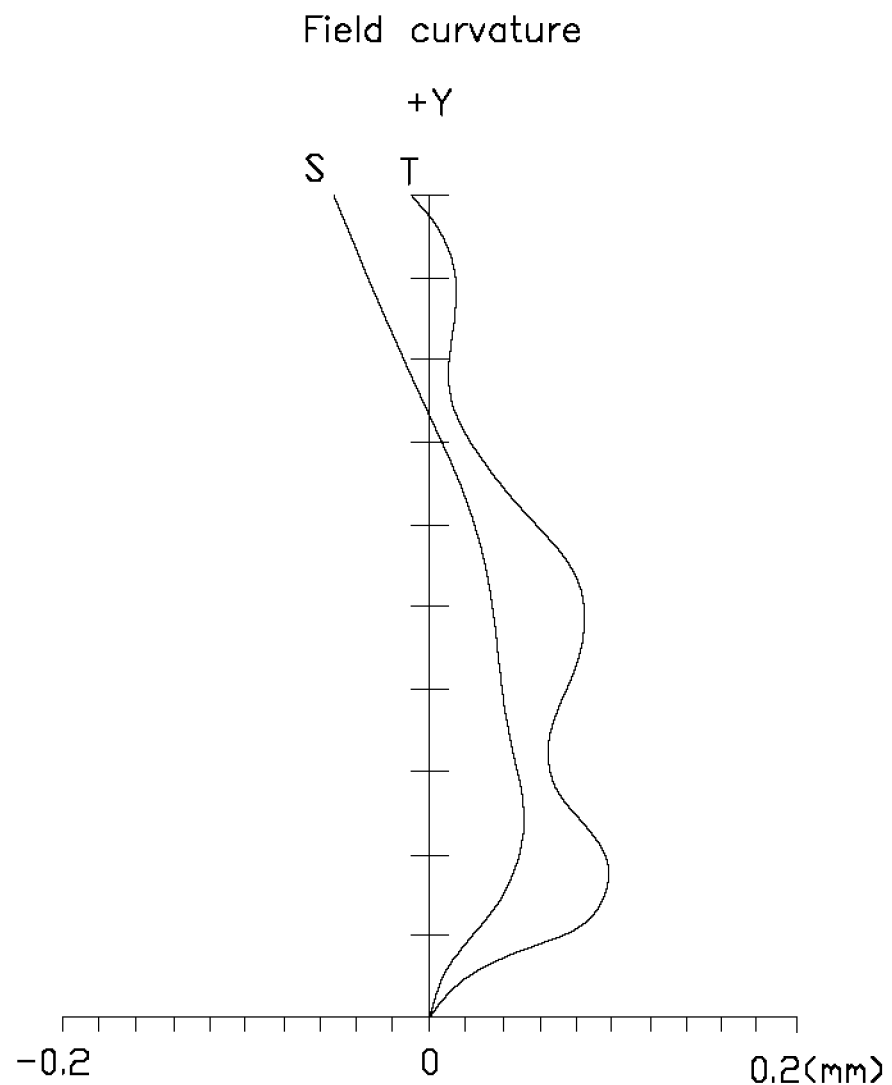
Figure 10:
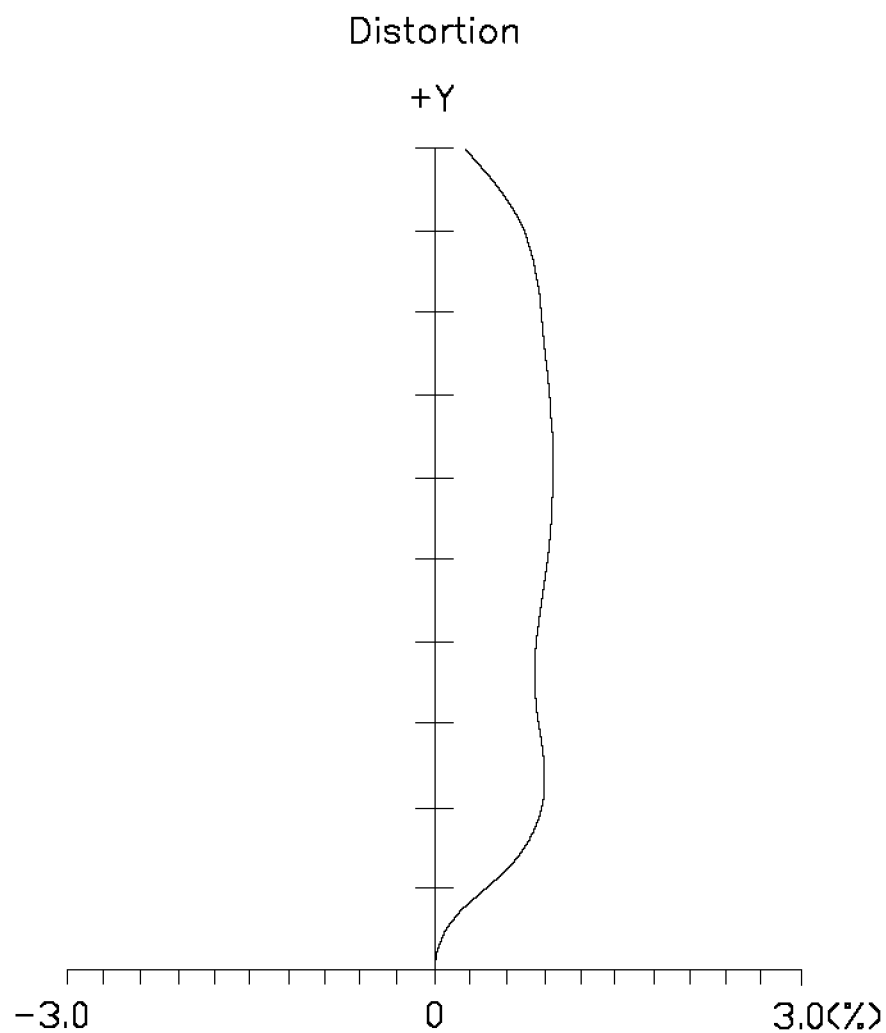
Figure 11:
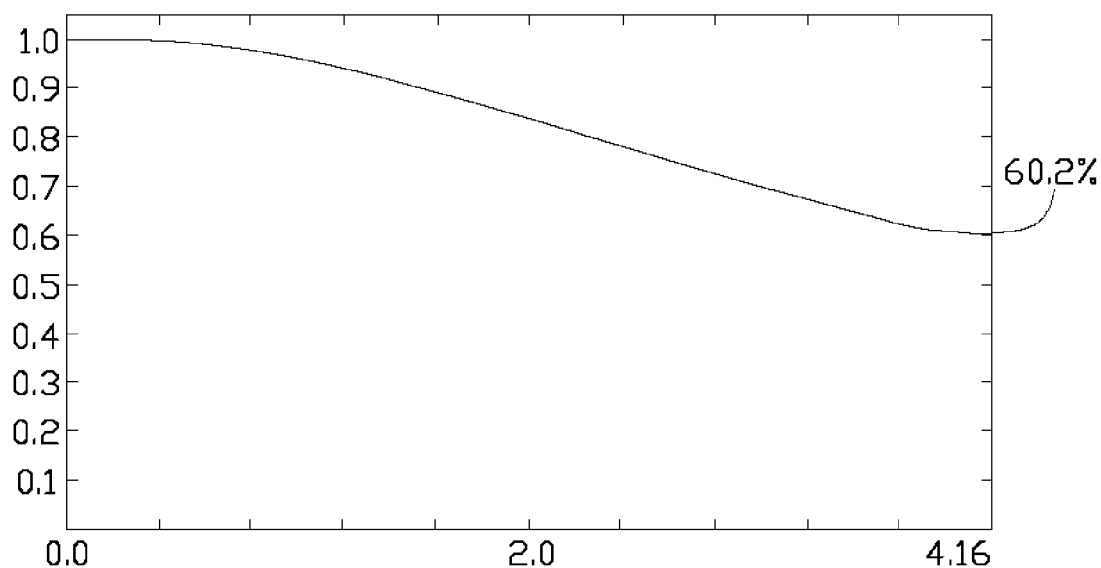
Figure 12:
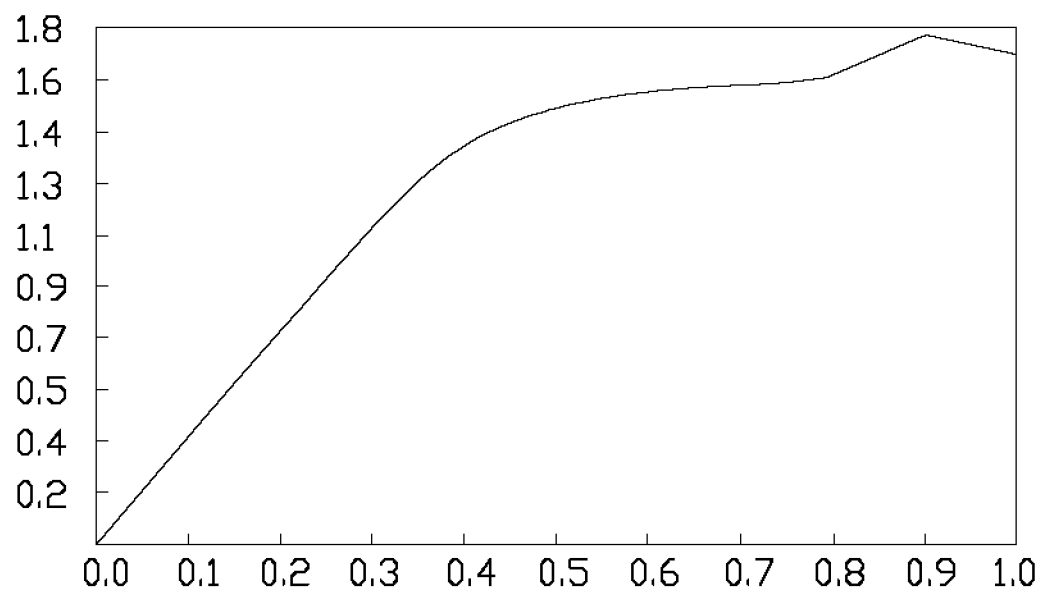
Figure 13:
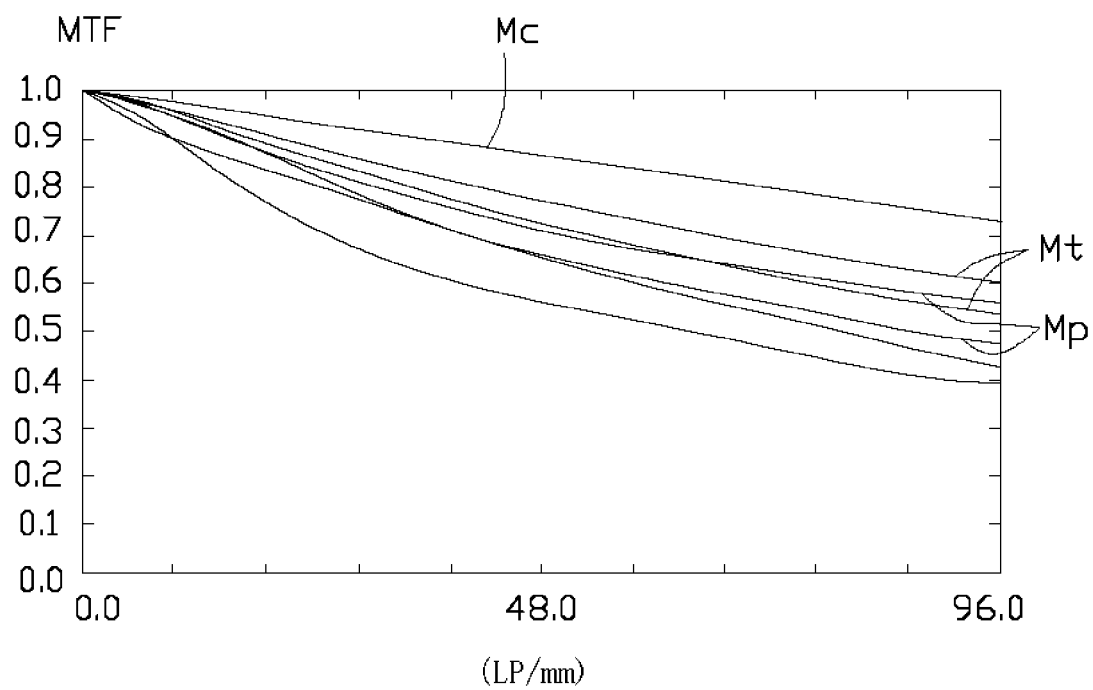

FIGS. 8-13 are graphs showing spherical aberration, field curvature, distortion, relative illumination, chief ray angle, and characteristic curves of modulation transfer function occurring in the second exemplary embodiment of the wide-angle image lens 100. In FIG. 8, curves are spherical aberration characteristic curves of I light (wavelength: 825 nm), II light (wavelength: 835 nm), III light (wavelength: 845 nm), IV light (wavelength: 830 nm) and V light (wavelength: 815 nm) of the wide-angle image lens 100. The spherical aberration of the wide-angle image lens 100 of the second exemplary embodiment is from −0.05 mm to 0.05 mm. As illustrated in FIG. 9, the curves T and S are respectively the tangential field curvature curve and the sagittal field curvature curve. The field curvature of the second exemplary embodiment of the wide-angle image lens 100 is from −0.20 mm to 0.20 mm. In FIG. 10, the distortion of the second exemplary embodiment of the wide-angle image lens 100 is from 0% to 3.00%. In FIG. 11, the relative illumination of the center region of the image plane 60 is kept higher than that of the edge region 60.2%. As shown in FIG. 12, the chief ray angle of the wide-angle image lens 100 of the second embodiment is limited in a range of: 0~1.8 degrees. Furthermore, as shown in FIG. 13, for half of the Nyquist frequency (about 48 lp/mm), the MTF of the central field is greater than 86% (see curve mc), the MTF of the 0.8 field is greater than 65% (see curve mp), the MTF between the central field and the 0.8 field is in a range of: 65%~86% (see curve mt, for example). Overall, in this embodiment, the spherical aberration, the field curvature, the distortion, and the chief ray angle are limited to within a small range.

Example 3

Tables 9-12 show a third embodiment of the wide-angle image lens 100.

TABLE 9

| Surface | type | ri (mm) | Di (mm) | ni | Vi | ki |
|---|---|---|---|---|---|---|
| first surface S1 | aspherical | 4.22 | 2.26 | 1.53 | 56.0 | −9.6646 |
| second surface S2 | aspherical | 4.68 | 0.25 | — | — | — |
| aperture stop 20 | standard | infinity | 0.20 | — | — | — |
| third surface S3 | aspherical | −4.37 | 2.07 | 1.53 | 56.0 | — |
| fourth surface S4 | aspherical | −2.18 | 1.20 | — | — | −0.0383 |
| fifth surface S5 | aspherical | −1.33 | 2.05 | 1.53 | 56.0 | −1.7983 |
| sixth surface S6 | aspherical | −2.48 | 0.10 | — | — | −4.2272 |
| seventh surface S7 | aspherical | 3.84 | 3.80 | 1.53 | 56.0 | −4.0391 |
| eighth surface S8 | aspherical | 32.19 | 0.72 | — | — | — |
| ninth surface S9 | standard | infinity | 0.70 | 1.52 | 64.2 | — |
| tenth surface S10 | standard | infinity | 0.60 | — | — | — |
| eleventh surface S11 | standard | infinity | 0.55 | 1.52 | 64.2 | — |
| twelfth surface S12 | standard | infinity | 0.40 | — | — | — |
| image plane 60 | standard | — | — | — | — | — |

TABLE 10

| aspherical coefficient | first surface S1 | second surface S2 | third surface S3 | fourth surface S4 |
|---|---|---|---|---|
| A4 | 0.0186 | 1.4E−03 | −0.0170 | 9.0E−03 |
| A6 | −1.8E−03 | 0.0139 | 4.8E−03 | −1.9E−04 |
| A8 | 2.3E−04 | −0.0103 | −0.0100 | 4.6E−05 |
| A10 | — | — | — | — |

TABLE 11

| aspherical coefficient | fifth surface S5 | sixth surface S6 | seventh surface S7 | eighth surface S8 |
|---|---|---|---|---|
| A4  | −9.0E−03 | −0.0293  | −4.7E−03 | −4.4E−03 |
| A6  | −5.8E−03 | 3.3E−03  | 3.7E−04  | 1.3E−03  |
| A8  | 9.2E−04  | −3.8E−04 | −1.1E−05 | 4.4E−08  |
| A10 | —        | 1.9E−05  | 1.3E−07  | —        |

TABLE 12

| F(mm) | F/No | 2ω |
|---|---|---|
| 5.90 | 2.37 | 70.24° |

In the third embodiment, D=8.32 mm; TTL=14.909 mm; Z=0.51 mm; Y=3.083 mm; ET4=1.894 mm; F1=30.296 mm; F2=6.255 mm; F3=−14.077 mm; F4=7.942 mm.

Figure 14:
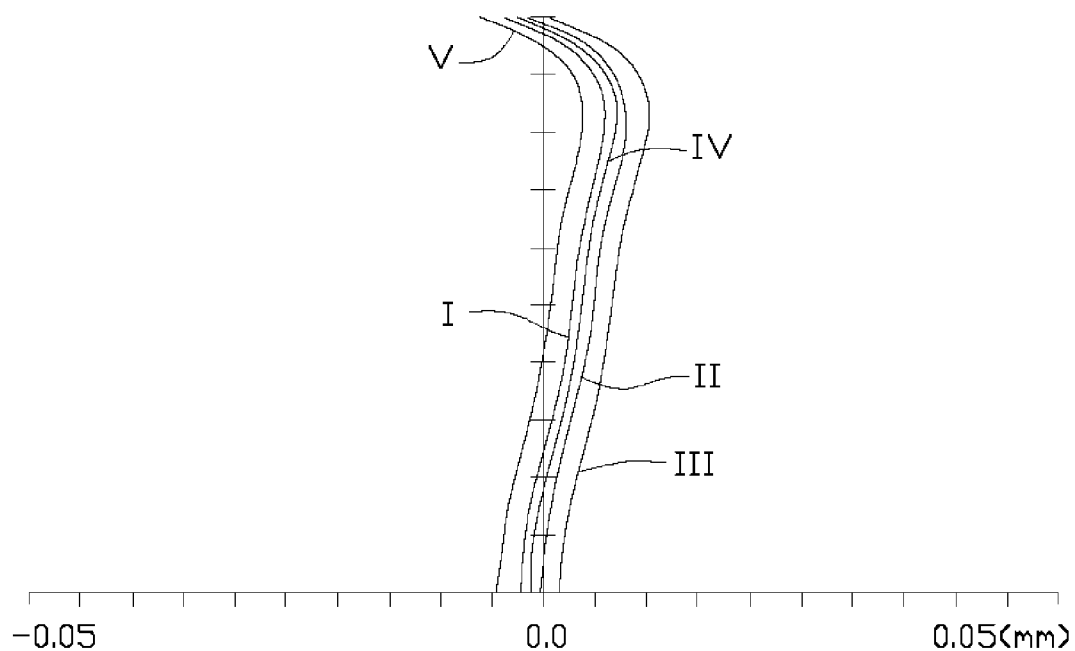
FIGS. 14~19 are graphs respectively showing spherical aberration, field curvature, distortion, relative illumination, chief ray angle, and characteristic curves of modulation transfer function occurring in the wide-angle image lens, according to a third exemplary embodiment.
Figure 15:
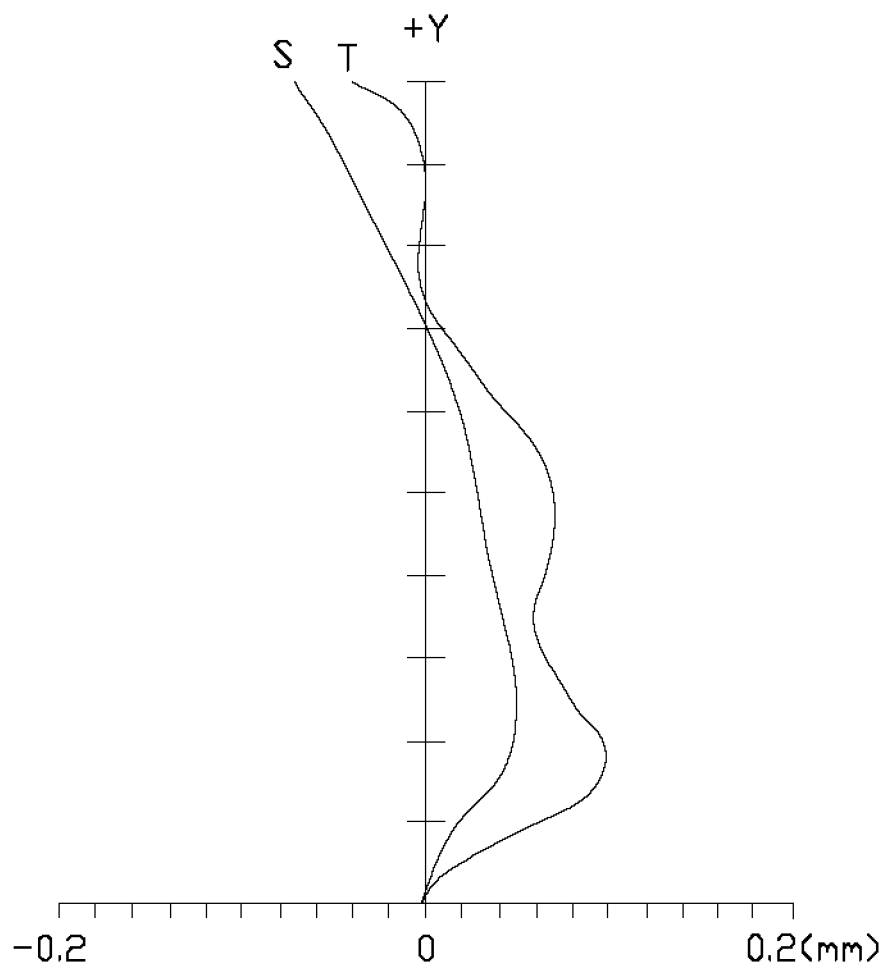
Figure 16:
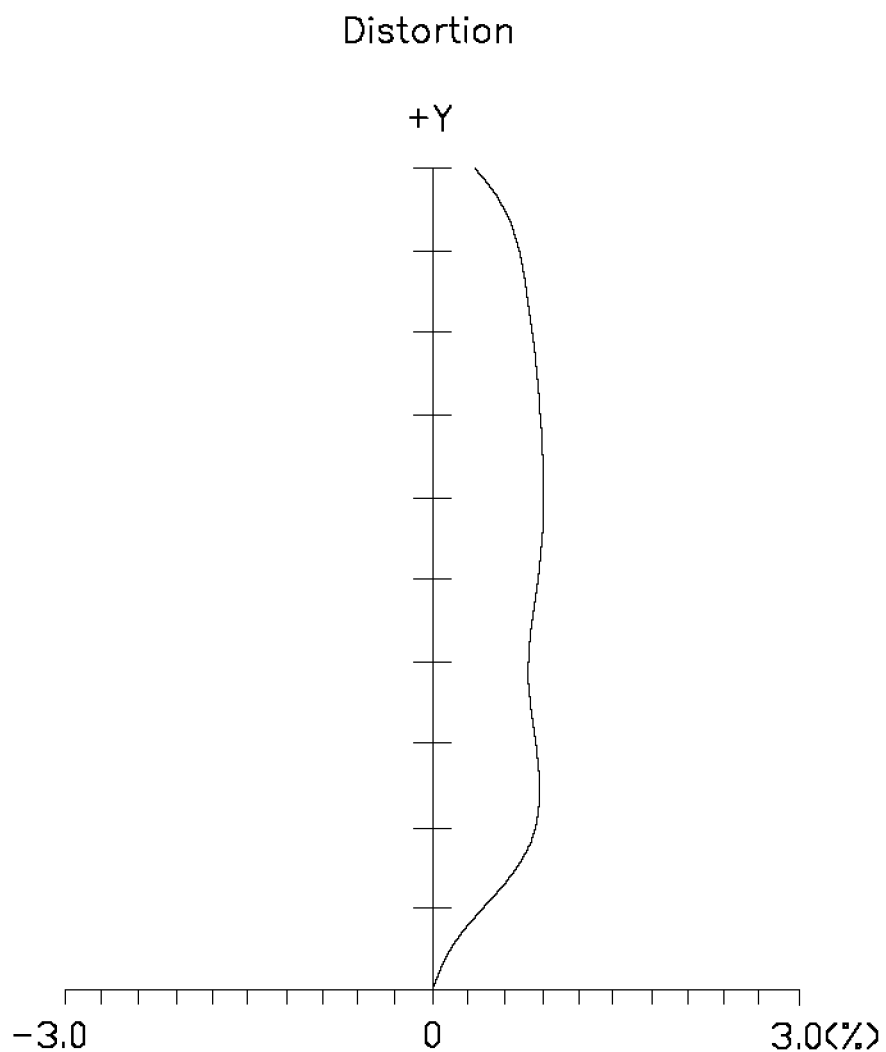
Figure 17:
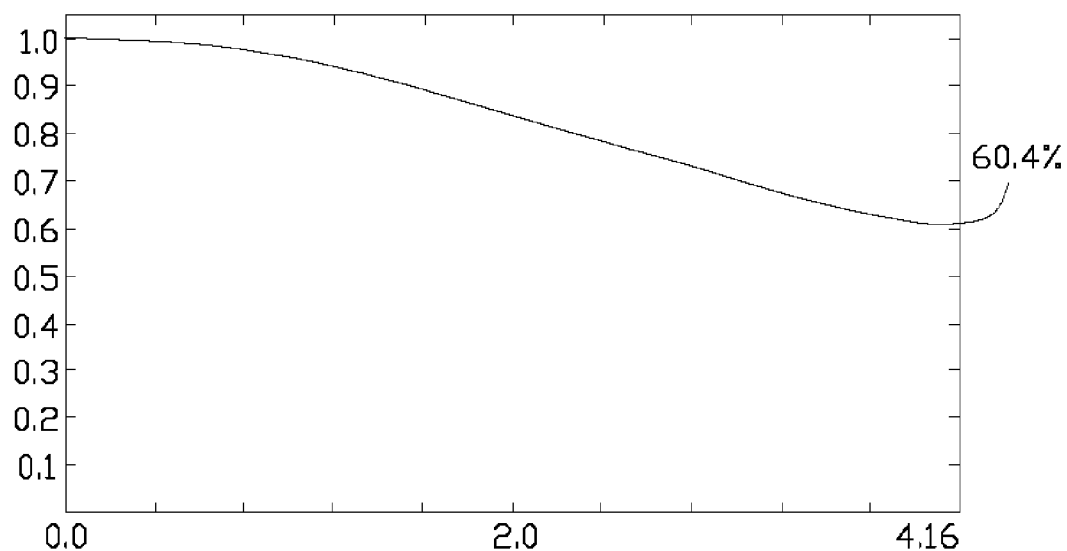
Figure 18:
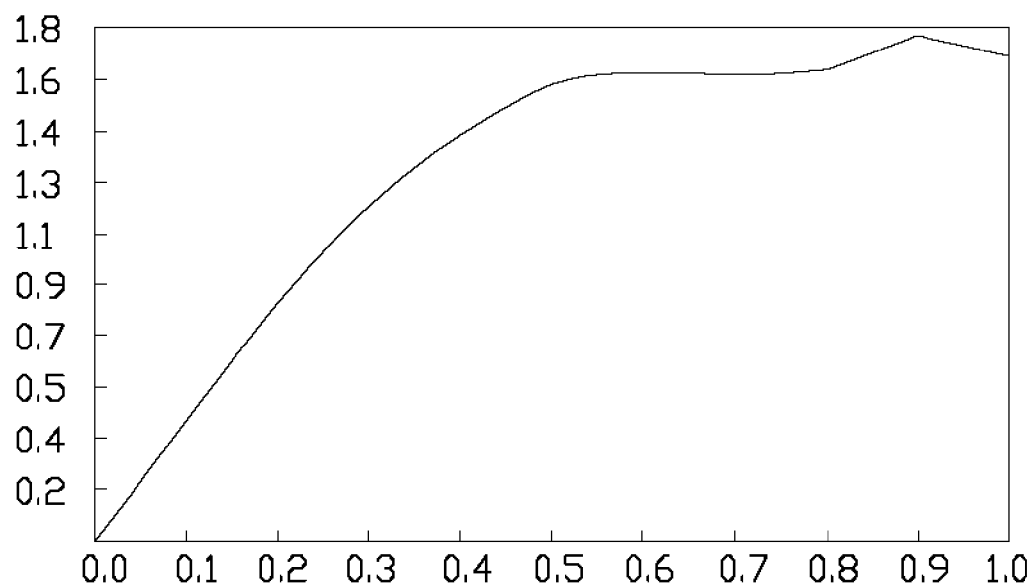
Figure 19:
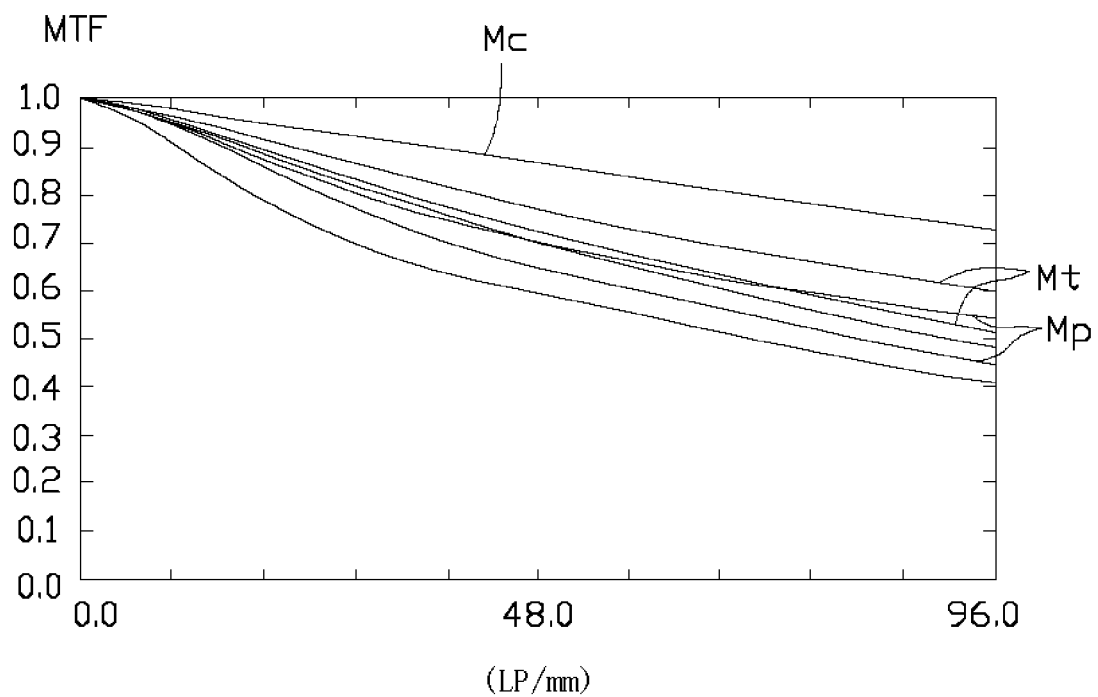

FIGS. 14-19 are graphs showing spherical aberration, field curvature, distortion, relative illumination, chief ray angle, and characteristic curves of modulation transfer function occurring in the third exemplary embodiment of the wide-angle image lens 100. In FIG. 14, curves are spherical aberration characteristic curves of I light (wavelength: 825 nm), II light (wavelength: 835 nm), III light (wavelength: 845 nm), IV light (wavelength: 830 nm) and V light (wavelength: 815 nm) of the wide-angle image lens 100. The spherical aberration of the wide-angle image lens 100 of the third exemplary embodiment is from −0.05 mm to 0.05 mm. As illustrated in FIG. 15, the curves T and S are respectively the tangential field curvature curve and the sagittal field curvature curve. The field curvature of the third exemplary embodiment of the wide-angle image lens 100 is from −0.20 mm to 0.20 mm. In FIG. 16, the distortion of the third exemplary embodiment of the wide-angle image lens 100 is from 0% to 3.00%. In FIG. 17, the relative illumination of the center region of the image plane 60 is kept higher than that of the edge region 60.4%. As shown in FIG. 18, the chief ray angle of the wide-angle image lens 100 of the third embodiment is limited in a range of: 0~1.8 degrees. Furthermore, as shown in FIG. 19, for half of the Nyquist frequency (about 48 lp/mm), the MTF of the central field is greater than 86% (see curve mc), the MTF of the 0.8 field is greater than 65% (see curve mp), the MTF between the central field and the 0.8 field is in a range of: 65%~86% (see curve mt, for example). Overall, in this embodiment, the spherical aberration, the field curvature, the distortion, and the chief ray angle are limited to within a small range.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A wide-angle image lens, in the order from the object side to the image side thereof, comprising:
   a first lens having positive refraction power and comprising a first surface facing the object side and a second surface facing the image side;
   a second lens having positive refraction power and comprising a third surface facing the object side and a fourth surface facing the image side;
   a third lens having negative refraction power and comprising a fifth surface facing the object side and a sixth surface facing the image side;
   a fourth lens having positive refraction power and comprising a seventh surface facing the object side and an eighth surface facing the image side; and
   an image plane;
   wherein the image lens satisfies the following formulas:

$D/TTL>0.45$;

$CT4/ET4<2.11$;

$Z/Y>0.06$;

wherein D is the maximum image diameter of the image plane; TTL is a total length of the wide-angle image lens; CT4 is a distance along an optical axis of the wide-angle image lens from the seventh surface to the eighth surface; ET4 is a distance in a direction parallel to the optical axis of the wide-angle image lens from an outmost edge of the seventh surface to an outmost edge of the eighth surface; Z is a distance from a central point of the fifth surface to an outmost edge of the sixth surface along the optical axis; Y is a distance from the outmost edge of the sixth surface to the optical axis along a direction perpendicular to the optical axis;
   wherein the wide-angle image lens further satisfies the formulas:

$0<R11/F1<0.24$ and $0<R12/F1<0.26$;

wherein R11 is a curvature radius of the first surface; R12 is a curvature radius of the second surface; F1 is a focal length of the first lens.

2. The wide-angle image lens as claimed in claim 1, wherein the wide-angle image lens further satisfies the formulas:

$-0.80<R21/F2<0$ and $-0.4<R22/F2<0$;

wherein R21 is a curvature radius of the third surface; R22 is a curvature radius of the fourth surface; F2 is a focal length of the second lens.

3. The wide-angle image lens as claimed in claim 1, wherein the wide-angle image lens further satisfies the formulas:

$0<R41/F4<0.59$ and $0<R42/F4<4.39$;

wherein R41 is a curvature radius of the seventh surface; R42 is a curvature radius of the eighth surface; F4 is a focal length of the fourth lens.

4. The wide-angle image lens as claimed in claim 1, wherein the wide-angle image lens further satisfies the formulas:

$Vd1>53$, $Vd2>53$, $Vd3>53$, and $Vd4>53$;

wherein Vd1 is the Abbe number of the first lens; Vd2 is the Abbe number of the second lens; Vd3 is the Abbe number of the third lens; and Vd4 is the Abbe number of the fourth lens.

5. The wide-angle image lens as claimed in claim 1, wherein the first, second, third, fourth, fifth, sixth, seventh, and eighth surfaces are aspherical surfaces.

6. The wide-angle image lens as claimed in claim 1, wherein the first surface is a convex surface facing the object side, the second surface is a concave surface facing the image side, the third surface is a concave surface facing the object side, the fourth surface is a convex surface facing the image side, the fifth surface is a concave surface facing the object side, the sixth surface is a convex surface facing the image side, the seven surface is a convex surface facing the object side, and the eighth surface is a convex surface facing the image side.

7. The wide-angle image lens as claimed in claim 1, further comprising an aperture stop, wherein the aperture stop is positioned between the first lens and the second lens.

8. The wide-angle image lens as claimed in claim 1, further comprising an IR-cut filter, wherein the IR-cut filter is positioned between the fourth lens and the image plane.

9. The wide-angle image lens as claimed in claim 8, further comprising a protective glass, wherein the protective glass is positioned between the IR-cut filter and the image plane.

10. A wide-angle image lens, in the order from the object side to the image side thereof, comprising:
   a first lens having positive refraction power and comprising a first surface facing the object side and a second surface facing the image side;
   a second lens having positive refraction power and comprising a third surface facing the object side and a fourth surface facing the image side;
   a third lens having negative refraction power and comprising a fifth surface facing the object side and a sixth surface facing the image side;
   a fourth lens having positive refraction power and comprising a seventh surface facing the object side and an eighth surface facing the image side; and
   an image plane;
   wherein the image lens satisfies the following formulas:

$D/TTL>0.45;$ $CT4/ET4<2.11;$ $Z/Y>0.06;$ wherein D is the maximum image diameter of the image plane; TTL is a total length of the wide-angle image lens; CT4 is a distance along an optical axis of the wide-angle image lens from the seventh surface to the eighth surface; ET4 is a distance in a direction parallel to the optical axis of the wide-angle image lens from an outmost edge of the seventh surface to an outmost edge of the eighth surface; Z is a distance from a central point of the fifth surface to an outmost edge of the sixth surface along the optical axis; Y is a distance from the outmost edge of the sixth surface to the optical axis along a direction perpendicular to the optical axis;
   wherein the wide-angle image lens further satisfies the formulas:

$0<|R11/F1|<|R32/F3|<|R22/F2|<|R41/F4|;$ wherein R11 is a curvature radius of the first surface of the first lens; F1 is a focal length of the first lens; R32 is a curvature radius of the sixth surface; F3 is a focal length of the third lens;

R22 is a curvature radius of the fourth surface; F2 is a focal length of the second lens; R41 a curvature radius of the seventh surface; F4 is a focal length of the fourth lens.

11. The wide-angle image lens as claimed in claim 10, wherein the wide-angle image lens further satisfies the formulas:

$|R42/F4|>|R41/F4|>0;$ wherein R42 is a curvature radius of the eighth surface of the fourth lens.

12. A wide-angle image lens, in the order from the object side to the image side thereof, comprising:
   a first lens having positive refraction power and comprising a first surface facing the object side and a second surface facing the image side;
   a second lens having positive refraction power and comprising a third surface facing the object side and a fourth surface facing the image side;
   a third lens having negative refraction power and comprising a fifth surface facing the object side and a sixth surface facing the image side;
   a fourth lens having positive refraction power and comprising a seventh surface facing the object side and an eighth surface facing the image side; and
   an image plane;
   wherein the image lens satisfies the following formulas:

$D/TTL>0.45;$ $CT4/ET4<2.11;$ $Z/Y>0.06;$ wherein D is the maximum image diameter of the image plane; TTL is a total length of the wide-angle image lens; CT4 is a distance along an optical axis of the wide-angle image lens from the seventh surface to the eighth surface; ET4 is a distance in a direction parallel to the optical axis of the wide-angle image lens from an outmost edge of the seventh surface to an outmost edge of the eighth surface; Z is a distance from a central point of the fifth surface to an outmost edge of the sixth surface along the optical axis; Y is a distance from the outmost edge of the sixth surface to the optical axis along a direction perpendicular to the optical axis;
   wherein the wide-angle image lens further satisfies the formulas:

$0<R31/F3<0.2$ and $0<R32/F3<0.28;$ wherein R31 is a curvature radius of the fifth surface; R32 is a curvature radius of the sixth surface; F3 is a focal length of the third lens.

\* \* \* \* \*